H. KROM.
Automatic Gate.

No. 163,084.

Patented May 11, 1875.

WITNESSES:
C. Neveux
A. F. Terry

INVENTOR:
Hiram Krom
BY
ATTORNEYS.

THE GRAPHIC CO.PHOTO-LITH.39 & 41 PARK PLACE,N.Y.

UNITED STATES PATENT OFFICE.

HIRAM KROM, OF DARTFORD, WISCONSIN.

IMPROVEMENT IN AUTOMATIC GATES.

Specification forming part of Letters Patent No. 163,084, dated May 11, 1875; application filed March 20, 1875.

*To all whom it may concern:*

Figure 1:
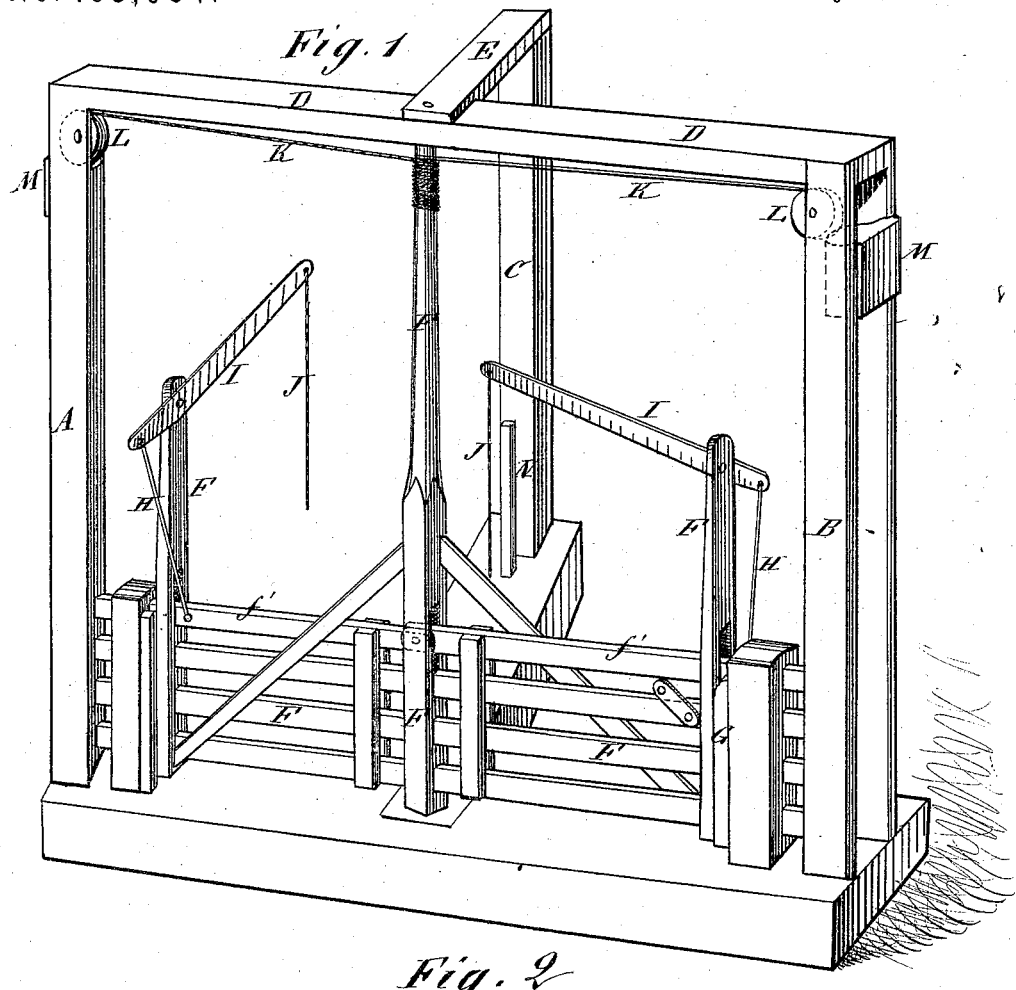
Figure 2:
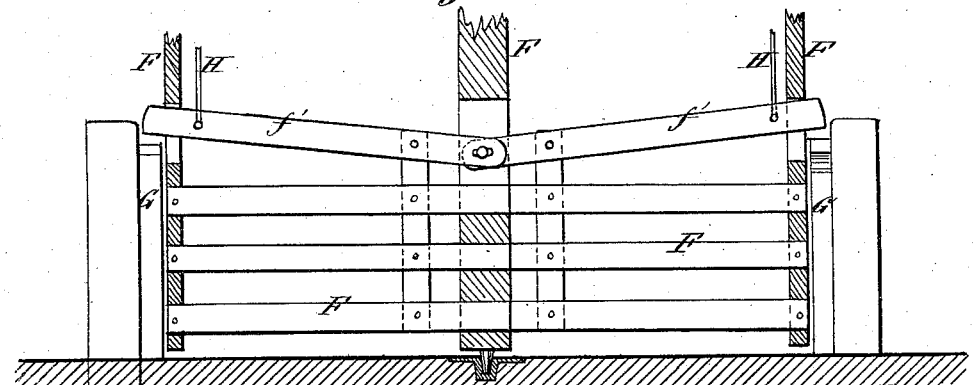

Be it known that I, HIRAM KROM, of Dartford, in the county of Green Lake and State of Wisconsin, have invented a new and useful Improvement in Gates, of which the following is a specification:

Figure 1 is a perspective view of my improved gate. Fig. 2 is a detail section of the same.

Similar letters of reference indicate corresponding parts.

The invention is an improvement in the class of revolving gates operated automatically by a weighted cord. My improved gate is constructed in duplicate and aligned parts, rigidly connected to and turning upon a central pivot-post, to which weighted cords are attached.

The invention consists in the combination, with a double or centrally-pivoted gate, of latches which are so connected together as to operate simultaneously, as hereinafter described.

The posts A B are located on opposite sides of the roadway, and the post C in the center of the roadway, equidistant from posts A B. The tops of the posts are connected by bars D E. The gate F is rigidly attached to a central pivot-post or cross-bar. The upper horizontal bars $f$ of the gate F serve as latches, and are pivoted to bars attached to the gate F at a little distance from its central cross-bar. The inner ends of the slats $f'$ overlap each other in a slot in the central cross-bar, and have short slots formed in their ends to receive the pin or bolt by which they are pivoted to said central cross-bar. The outer ends of the slats $f'$ work in slots in the end cross-bars of the gate, and project upon the outer sides of said end cross-bars to latch upon the catches G attached to the posts A B, or to short posts set in the ground at the inner sides of the said posts A B. To the latches $f'$, at a little distance from the end cross-bars of the gate F, are attached the lower ends of the connecting-rods H, the upper ends of which are pivoted to the short arms of the levers I, which are pivoted to the upper ends of the end cross-bars of the gate F. The levers I are thus at right angles with the gate; and to the ends of their long arms are attached ropes J, which hang in such positions that their lower ends may be readily grasped by a person upon horseback or sitting in a wagon.

When unlatched, the gate is turned on its central or pivot bar by means of weights M and cords K, which pass over pulleys L and connect with the top of the pivot-bar, as shown. As the gate swings open its latch catches on bar N of post C.

Having thus described my invention, I claim as new and desire to secure by Letters Patent—

The combination, with the double gate, the central pivot-bar, and latch-posts G, of the latches $f'$, connected at their inner ends to admit of simultaneous operation, as shown and described.

HIRAM KROM.

Witnesses:
    JOSIE KROM,
    HANNAH KROM.